United States Patent [19]

Green

[11] 3,985,029
[45] Oct. 12, 1976

[54] VARIABLE RESTRICTION FUEL FLOW METER

[76] Inventor: Walter F. Green, 4431 Logan Ave. NW., Canton, Ohio 44709

[22] Filed: Jan. 5, 1976

[21] Appl. No.: 646,840

[52] U.S. Cl. .................................................73/210
[51] Int. Cl.² ......................................... G01F 1/22
[58] Field of Search ....................................... 73/210

[56] References Cited
UNITED STATES PATENTS

| | | | |
|---|---|---|---|
| 3,117,446 | 1/1964 | Green | 73/210 |
| 3,133,441 | 5/1964 | Conkling | 73/210 |

*Primary Examiner*—Donald E. Watkins
*Assistant Examiner*—John P. Beauchamp
*Attorney, Agent, or Firm*—Frease & Bishop

[57] ABSTRACT

An improved fuel flow meter construction for visually indicating the flow rate of fuel therethrough. A vertically extending tubular body has a central vertically extending bore with a sight glass mounted on its upper end, and has an indicating needle vertically movable within the body and sight glass. A hollow sleeve is mounted within the bore of the tubular body and has a metering orifice formed at its bottom end. A vapor deflector is mounted on the upper open end of the sleeve. An intermediate portion of the sleeve is spaced from the bore wall and forms an outer downstream fuel passage therebetween which communicates with a fuel outlet line connected to the tubular body. The interior of the sleeve provides an inner upstream fuel passage above the orifice and communicates with a fuel inlet line connected to the tubular body below the metering orifice. Fuel outlet ports are formed in the top portion of the sleeve connecting the inner fuel passage with the outer fuel passage. The metering needle has a tapered metering portion which extends freely movably through the orifice, and the top portion of the metering needle extends through a closely controlled complementary hole formed in the vapor deflector. The metering needle raises and lowers within the sight glass depending upon the rate of fuel flow through the metering orifice providing a visual indication of the fuel flow rate. The vapor deflector reduces the accumulation of fuel vapors in the sight glass, and the inner and outer fuel passages reduce turbulence adjacent the metering orifice, thereby improving the accuracy of the metering of the fuel flow rate.

16 Claims, 8 Drawing Figures

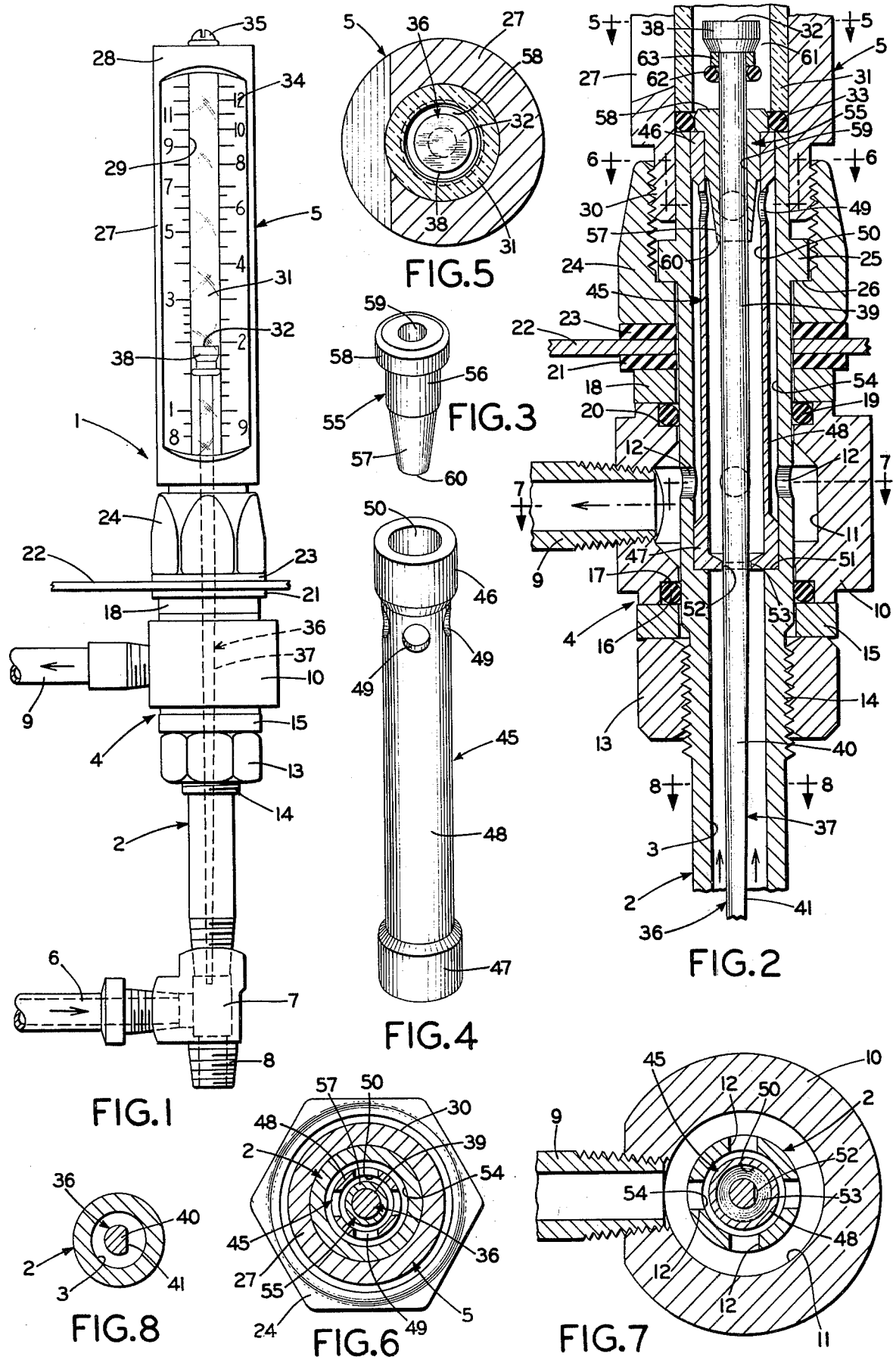

VARIABLE RESTRICTION FUEL FLOW METER

CROSS REFERENCE TO RELATED PATENT

The fuel flow meter construction of this invention is an improvement upon my fuel flow meter construction of U.S. Pat. No. 3,117,446, granted Jan. 14, 1964.

BACKGROUND OF THE INVENTION

1. FIELD OF THE INVENTION

The invention relates to improvement in fuel flow meters of the type having a vertically upwardly extending sight glass for directly visually indicating the flow rate of fuel therethrough. More particularly, the invention relates to a fuel flow meter of the foregoing type having means reducing the accumulation of vapors in the sight glass and reducing turbulence adjacent the metering orifice to obtain more accurate flow rate indications.

2. DESCRIPTION OF THE PRIOR ART

Various prior constructions of fuel flow meters of the type having an upwardly extending sight glass portion through which fuel flow rates may be visually observed or indicated have included a vertically slidable rod, the upper end of which is received in the sight glass portion to provide the visual indications and the lower end of which is provided with a disc or float-like member such as shown in U.S. Pat. Nos. 1,215,129, 1,989,366, 2,073,372, 2,076,562, 2,293,987, 2,388,672, 2,955,465 and 2,350,343. The disc or float member is freely vertically slidable in a particularly shaped metering chamber and may extend through an upper or lower orifice or restriction in the vertical flow meter. Various problems and undesirable operating characteristics have been encountered with such meter constructions, which are set forth in and which are largely eliminated by my fuel flow meter construction of U.S. Pat. No. 3,117,446.

Several minor problems and difficulties have been encountered with the fuel flow meter construction of the type shown in my patent, as well as being present in other meter constructions set forth in the patents listed above. Fuel vapors will collect in the sight glass, especially during stop and go driving in warm weather, which seriously affects the damping action between the pin head and sight glass in thos constructions where the pin head is used to achieve a damping action. These fuel vapors or bubbles in the sight glass affect the accuracy of the metering being provided. Another problem encounterred with such prior meter constructions is the exact manufacturing tolerances required in the sight glass tube or chamber and needle head where the metering needle head is used as the damping means in combination with the sight glass. Such precisioned manufactured and machined parts increase considerably the cost of the fuel flow meter since most of the commercially available low-cost glass or plastic tubing used for the sight glass is not provided with the required internal bore linearity and uniformity.

Still another minor problem encountered with meter constructions of the type shown in my U.S. Pat. No. 3,117,446, is the creation of turbulence in the area of the metering orifice. The fuel or liquid being measured flows upwardly through the restricted orifice at a relatively high rate of speed, which flow then must reverse and flow downwardly through the outlet holes located just above the metering orifice inside the tubular body which creates turbulence with the incoming upwardly flowing fuel. A further shortcoming of such prior meter constructions is the formation of the metering orifice at a central position in the interior bore of a tubular member requiring machining from both the upper and lower ends of the tube to form the orifice, which tube also must be provided with external threaded areas for attaching and mounting additional components thereon. Again, this precision machining at a relatively difficult location on the tubular member to form the orifice increases the cost per unit of prior meter constructions. Still another shortcoming of such prior meter constructions is the inability to use such constructions to measure the fuel flow rate of fluids other than the particular fluid (gasoline) for which it was designed, since the density of the fluid being measured affects the reading due to the buoyancy exerted on the specifically weighted and designed metering needle, disc or float member mounted thereon.

SUMMARY OF THE INVENTION

Objectives of the invention include providing an improved fuel flow meter construction which overcomes the difficulties discussed above, while still providing a visual indicating flow meter construction of maximum simplicity, at a minimum of cost, and which is adaptable to extremely small flow rates and different densities of fuel; providing such an improved fuel flow meter construction which uses a freely, vertically, movable metering needle in combination with a simple metering orifice formed in an outlet tube which is telescopically mounted within a bore of an outer tubular member, which eliminates expensive machining costs heretofore required for forming the metering orifice of prior constructions, and which sleeve forms an inner fuel passage which communicates with the fuel inlet line providing an upstream path for the fuel flow after passing through the metering orifice, and which provides an outer fuel passage for the downstream fuel flow which communicates with the fuel outlet line, thereby eliminating turbulence heretofore encountered in the vicinity of the metering orifice; providing such an improved meter construction having a vapor deflector telescopically mounted on the top open end of the improved orifice sleeve, which vapor deflector has an inwardly tapered conical lower end surrounding a closely controlled opening extending through the deflector which is complementary to the diameter of the metering needle, thereby reducing the passage of fuel vapor into the sight glass, and in which the controlled vapor ejector opening provides a metering needle damping action without the heretofore required critical machining of the needle head diameter with respect to the internal diameter of the sight glass as in prior constructions; providing such an improved meter construction in which annular weights may be mounted on the upper end of the metering needle beneath the needle head to enable the meter construction to be used for measuring fuel flow rates of fuels having various densities; providing such a meter construction in which a sealing O-ring may be mounted on the upper end of the metering needle head to provide an effective seal between the metering needle and vapor deflector opening reducing the flow of vapors and therethrough into the sight glass when the engine is stopped and no fuel is flowing; providing such a meter construction which increases the accuracy of the flow rate indication due to the reduction in the collection of fuel vapors in the sight glass and reduction of turbulence in the vicinity of the metering orifice; and providing such an improved fuel flow meter construction which eliminates difficulties heretofore encountered, achieves the stated objectives simply and effectively, and solves problems and satisfies existing needs.

These objectives and advantages are obtained by the improved fuel flow meter construction of the type having a vertically extending tubular body with a vertically extending opening formed therethrough, fuel inlet and outlet means provided on the body with a closed sight glass mounted on the upper end of the tubular body, a metering needle movably within the vertically extending opening having an upper end extending into the sight glass, and in which the sight glass has position indicating means; the general nature of the improvements may be stated as including hollow sleeve means telescopically mounted within the vertically extending opening and forming upwardly extending inner fuel passage means within the sleeve means, the upwardly extending fuel passage means communicating with the fuel inlet means; relief means provided on the exterior of the sleeve means and forming downwardy extending outer fuel passage means about the exterior of the sleeve means within a portion of the tubular body opening means, with the downwardly extending fuel passage means communicating with the fuel outlet means; metering orifice means having a circular knife-edge being formed in the bottom end of the sleeve means; vapor ejector means mounted within the vertically extending opening of the tubular body, and having an inwardly tapered lower end projecting into an open top end of the sleeve means; a vertically extending accurately controlled central opening formed through the vapor ejector means complementary to the upper portion of the metering needle, the needle being freely vertically movable through the central opening; outlet port means formed adjacent the upper portion of the sleeve means and extending between the inner and outer fuel passage means; and the upper end of the metering needle providing visual indication in the sight glass during fuel flow through the fuel inlet means, upwardly through the orifice means around the metering needle, upwardly through the sleeve means inner fuel passage means, through the outlet port means and downwardly through the outer fuel passage means, and through the fuel outlet means of the tubular body, indicating the rate of fuel flow through said orifice means.

BRIEF DESCRIPTION OF THE DRAWING

A preferred embodiment of the invention - illustrative of the best mode in which applicant has contemplated applying the principle - is set forth in the following description and shown in the accompanying drawing, and is particularly and distinctly pointed out and set forth in the appended claims.

FIG. 1 is a front elevation of the improved fuel flow meter construction, with the metering needle shown in an intermediate position;

FIG. 2 is an enlarged fragmentary sectional view of the metering portion of the improved flow meter construction, with only a portion of the sight glass being shown mounted thereon;

FIG. 3 is a perspective view of the vapor ejector of the improved fuel flow meter construction of FIGS. 1 and 2;

FIG. 4 is a perspective view of the orifice sleeve of the improved fuel flow meter construction of FIGS. 1 and 2;

FIG. 5 is a sectional view taken on line 5—5, FIG. 2;

FIG. 6 is a sectional view taken on line 6—6, FIG. 2;

FIG. 7 is a sectional view taken on line 7—7, FIG. 2; and

FIG. 8 is a sectional view taken on line 8—8, FIG. 2.

Similar numerals refer to similar parts throughout the drawing.

DESCRIPTION OF THE PREFERRED EMBODIMENT

The improved fuel flow meter construction of the present invention is illustrated particularly in FIGS. 1 and 2, and is indicated generally at 1. Construction 1 includes a main tubular, vertically extending body, indicated generally at 2, having a central opening 3 extending substantially the entire vertical height of body 2. body 2 includes a central metering portion indicated generally at 4, and has an upper sight glass assembly indicated generally at 5, mounted on the top of body 2.

Metering portion 4 is formed with a fuel inlet line 6 which is threadably received in a junction tee 7 mounted on the lower end of body 2. Tee 7 may include a threaded nipple 8 providing an additional fuel inlet port for tubular body 2. A fuel outlet line 9 is threadably connected to a collar 10 which is telescopically surrounding body 2 intermediate the vertical height thereof, and which forms a fuel chamber 11 which communicates with outlet line 9. Fuel chamber 11 communicates with central body openings 3 through a plurality of fuel outlet openings 12 formed through body 2 (FIG. 2).

Fuel outlet line 9 and collar 10 are maintained properly positioned on body 2 and properly positioned relative to fuel outlet openings 12 by a lower collar 13 which is threadably, telescopically received on threaded portion 14 of body 2. A washer 15 is interposed between collars 10 and 13 and bears upwardly against a resilient sealing O-ring 16 which is located within an annular recess 17 formed in the bottom end of collar 10.

The upper end of collar 10 (FIG. 2) abuts a second mounting washer 18 which bears downwardly against a second resilient sealing O-ring 19 mounted in an upper annular recess 20 formed in the top of collar 10. Washer 18 abuts a resilient sealing washer 21 underlying a representative mounting member 22, which may be, for instance, the cowling covering an automobile engine. Overlying mounting member 22 is another resilient sealing washer 23 which is maintained in pressed sealing engagement with mounting member 22 by a collar 24.

Sight glass assembly 5 is mounted on body 2 immediately above an annular shoulder 25 which is formed on the upper end of tubular body 2, which shoulder is engaged by a complementary internal shoulder 26 of collar 24. Sight glass 5 includes a sight glass cover 27 formed with a closed upper end 28, and having a sighting window 29. window 29 preferably extends substantially the entire vertical length of cover 27 and terminates downwardly from closed upper end 28 and upwardly from the lower end of cover 27. The lowermost end of cover 27 is formed with a reduced threaded end portion 30 which is telescopically slidable over the uppermost end of tubular body 2 and secured thereon by threadable engagement with collar 24 (FIG. 2).

A transparent sight glass tube 31 is received within cover 27 and extends between closed upper end 28 and the top portion of tubular body 2. The open bottom end of sight glass 31 is engaged with a sealing O-ring 33 (FIG. 2) with a similar O-ring (not shown) providing sealing engagement between the upper open end of sight glass tube 31 and sight glass cover 27. Flow graduations 34 are formed on sight glass cover 27 adjacent the sighting window 29 as shown in FIG. 1. An air release opening preferably is formed through closed upper end 28 of sight glass cover 27, and is closed by a screw 35.

A metering needle, indicated generally at 36, is mounted freely vertically, movable in opening 3 of tubular body 2, and includes a metering stem portion 37 and an indicating head portion 38. Indicating head portion 38 is mounted at the upper end of the metering stem portion 37 and is positioned within and surrounded by tubular sight glass 31. Metering head 38 has a flat top surface 32 which serves as an indicating line as sighted through sighting window 29 and can compare against indicating graduations 34.

The upper portion 39 of metering stem 37 preferably has a circular cross-sectional configuration as shown in FIG. 6, with the lower stem portion 40 being inwardly tapered downwardly as shown in FIGS. 7 and 8. The tapered metering stem portion 40 decreases progressively in cross-section at a predetermined rate downwardly to the lower end of needle 36. The rate of taper is determined by certain considerations discussed in detail in the above mentioned U.S. Pat. No. 3,117,446, which in turn determines the proper locations of graduations 34.

In accordance with the invention, an orifice sleeve, indicated generally at 45 (FIG. 4), is snugly mounted within central openings 3 of tubular body 2 (FIG. 2). Sleeve 45 has an elongated tubular configuration with a central bore 50 and with enlarged upper and lower collar ends 46 and 47, respectively, formed integrally with tubular-shaped body portion 48. A plurality of fuel outlet ports 49 are formed in the upper end of tubular body 48 beneath and adjacent to upper collar 46. Sleeve 45 is mounted within central opening 3 of tubular body 2 and is supported on an internal annular shoulder 51 formed on tubular body 2 below fuel outlet openings 12. In further accordance with the invention, a metering orifice 52 is formed by an inwardly tapering circular edge 53 formed in lower collar end 47 (FIG. 2), instead of being formed as an integral part of tubular body 2, which prior constructions required expensive machining operations and manufacturing procedures.

Central bore 50 of sleeve 45 provides an inner "upstream" fuel passage which axially aligns and communicates with central opening 3 of the lower portion of tubular body 2, which in turn communicates with fuel inlet 6. The relief or spacing provided between tubular portion 48 of sleeve 45 and the internal surface forming tubular opening 3 provides an outer "downstream" fuel passage 54 within tubular body 2 (FIG. 2). Outer fuel passage 54 communicates with the inner fuel passage or central bore 50 by way of fuel outlet ports 49, and communicates with fuel outlet line 9 through fuel outlet openings 12. Thus, fuel entering fuel inlet line 6 flows upwardly through opening 3 of the lower portion of tubular body 2, through metering orifice 52 and around metering stem portion 40, then upwardly through inner fuel passage 50, through fuel outlet ports 49, downwardly through outer fuel passage 54, and then into fuel outlet line 9 through outlet openings 12.

Another important feature of the invention, is vapor ejector 55 (FIGS. 2 and 3) which is telescopically received within the upper open end of orifice sleeve 45. Vapor ejector 55, preferably, has a tubular body 56 terminating in a tapered conical lowere end 57, and an enlarged top collar portion 58 formed integrally with body 56. An axial bore or central opening 59 extends throughout vapor ejector 55, and has an accurately controlled circular cross-sectional configuration or diameter complementary to upper portion 39 of metering needle 36.

Sealing O-ring 33 is mounted on the circumference of collar portion 58 and is in pressure sealing engagement between the bottom edge of sight glass 31 and the top edge of tubular body 2. O-ring 33 prevents escape of vapors from between the exterior of ejector 55 and the interior of sleeve 45, and form between the exterior of sleeve collar 46 and tubular body 2.

Indicating head 38 of metering needle 36 has a diameter less than the internal diameter of tubular sight glass 31 so as to provide a sufficiently large annular space 61 (FIG. 2) at all times between the circumference of head 38 and the walls of sight glass 31, to insure complete free vertical movement of head 38 within the sight glass. This spacing provides satisfactory operation of the metering needle without regard to any imperfections of the internal bore of the sight glass, and eliminates complex and expensive machining and sizing of indicating head portion 38, as in prior flow meter constructions. A sealing O-ring 62 is mounted on the upper end of metering needle 36 beneath indicating head 38, providing a sealing effect to bore 59 of vapor ejector 55 when there is no fuel flow through meter construction 1 and needle 36 is in an unraised position and rests upon the top of vapor ejector 55. An annular weight ring 63 may be mounted on the upper end of metering needle 36 by O-ring 62, the purpose of which is discussed below.

At the commencement of operation of flow meter construction 1, fuel flows into the lower portion of body opening 3 through fuel inlet line 6 upwardly through the circular metering orifice 52, between this orifice and taper 41 of metering stem portion 37, and upwardly through the inner fuel passage formed by sleeve bore 50 and outwardly through fuel outlet ports 49, and then downwardly through outer fuel passage 54 and into fuel outlet 9 through outlet openings 12. The flowing fuel raises needle 36 within tubular body 2, and correspondingly, indicating head 38 within sight glass 31. As the flow of fuel increases and decreases, the metering needle 36 will automatically move upwardly and downwardly proportionate to such flow and to provide greater or less opening through metering orifice 52 between circular edges 53 of the orifice and tapering metering stem portion 37.

As set forth in U.S. Pat. No. 3,117,446, the fact that metering needle 36 is tapered and is working against a stationary circular metering orifice 52, the pressure drop across the restriction is not constant. As the metering needle 36 rises, the weight being supported is constant but the area supporting it reduces so that the pressure drop across the restriction increases and flow rates are, therefore, not directly proportional to the area of the opening. Thus, it is necessary to take into account in calibration of the metering construction varying pressure as well as a varying orifice opening area. As stated, in this patent, the calculations necessary for calibration may be readily accomplished by known mathematical formulas apparent to those skilled in the art. Furthermore, although such calibration is somewhat more involved than the straight line calibration of prior constructions, the disadvantages of being required to make such calculations are clearly outweighed by the advantages of the present invention. Likewise, in view of the fact that a tapered vertically movable metering needle acts against a knife-edge orifice, changes in viscosity of fuel have only a negligible effect, even at the minimum flow rates, so that accurate fuel flow readings may be made at such lower fuel flow rates. Furthermore, friction between the vertically moving metering needle and the other stationary parts of the metering construction are negligible.

The particular arrangement of conical tapered end 57 of vapor ejector 55, together with outlet ports 49, reduce and nearly eliminate the accumulation of vapor bubbles and foam within sight glass 31. Tapered end 57 terminates in a sharp knife-like edge 60 which deflects nearly all of the rising fuel bubbles and fuel vapor upwardly along the outside surface of tapered end 57 where they flow outwardly through ports 49 and downwardly in outer fuel passage 54 to fuel outlet line 9. Thus, nearly all such vapor bubbles are prevented from entering sight glass 31 through the closely controlled space between vapor ejector bore 59 and metering needle portion 39. Heretofore, it had, under certain conditions, been necessary to operate air vent screw 35 at the top of sight glass cover 27 frequently to permit escape of the accumulated vapors from the top portion of sight glass 31.

The controlled spacing between needle portion 39 and vapor ejector bore 59 also provides a damping effect to needle 36 heretofore achieved by the matching of indicating head 38 and the internal walls of sight glass 31. If desirable, the spacing between needle portion 39 and vapor ejector 55 may be increased with the damping effect being provided by an enlarged needle head 38 as in my prior fuel meter construction, with tapered end 57 of the vapor ejector still deflecting the majority of the vapor and air bubbles around and upwardly through ports 49.

Improved fuel flow meter construction 1 has the advantage of reducing the machining for forming metering orifice 52 within the lower end of orifice sleeve 45, eliminates turbulence and the resulting vapor bubbles produced thereby in the vicinity of the metering orifice by eliminating the upward and downward movement of fuel within the same fuel passage by providing inner and outer fuel passages 50 and 54 within vertically extending opening 3 of tubular body 2. Vapor ejector 55 also reduces the accumulation of vapor and bubbles within sight glass 31 which affects accurate fuel flow readings and requires repeated manipulation of vent screw 35 to remove the same.

Another important feature of the improved fuel flow meter construction is the mounting of annular weight ring 63 on the upper end of metering needle 36. As discussed above in my U.S. Pat. No. 3,117,446, the weight of metering needle 36 is important in calibration of the fuel flow meter, as well as the particular fuel to be measured, which in most instances, will be gasoline for vehicles. It is desirable, however, to be able to adapt the fuel flow meter to other fuel systems and to other types of fuels, for example, kerosine, diesel fuel, etc. By using mathematical equations and formulas and the specific densities of the fuels to be measured, a specific amount of weight can be readily calculated which is required to be added to needle 36 for measuring the fuel flow rate of higher density fuels. Weights 63 preferably are annular metallic rings which are telescopically mounted on needle portion 39 and maintained thereon by O-ring 62.

O-ring 62 provides the further advantage to the improved meter construction in that it provides an effective seal or check valve for vapor deflector bore 59 when no fluid is flowing. O-ring 62 is in abutting engagement with the top surface of vapor ejector collar 58 when no fuel is flowing through the meter and will prevent passage of fuel vapor or bubbles from escaping upwardly through vapor ejector bore 59 into sight glass 31.

Accordingly, the improved fuel flow meter construction is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved fuel flow meter construction is constructed and used, the characteristics of the construction, and the advantageous, new and useful results obtained; the new and useful structures, devices, elements, arrangements, parts and combinations, are set forth in the appended claims.

I claim:

1. Improved fuel flow meter construction of the type having a vertically extending tubular body with a vertically extending opening formed therethrough, fuel inlet and outlet means provided on the body, a closed sight glass mounted on the upper end of the tubular body, metering orifice means provided within the vertically extending opening, a metering needle movably mounted within the vertically extending opening and extending through the metering orifice means and having an upper end extending into the sight glass, and the sight glass having position indicating means; the improvement including:

a. hollow sleeve means telescopically mounted within the vertically extending opening and forming upwardly extending inner fuel passage means within the sleeve means, said upwardly extending fuel passage means communicating with the fuel inlet means;

b. relief means provided on the exterior of the sleeve means and forming downwardly extending outer fuel passage means about the exterior of the sleeve means within a portion of the tubular body opening means, said downwardly extending fuel passage means communicating with the fuel outlet means;

c. vapor ejector means mounted within the vertically extending opening of the tubular body, and having an inwardly tapered lower end projecting into an open top end of the sleeve means;

d. a vertically extending accurately controlled central opening formed through the vapor ejector means complementary to the upper portion of the metering needle, said needle being freely vertically movable through said central opening;

e. outlet port means formed adjacent the upper portion of the sleeve means and extending between the inner and outer fuel passage means; and f. the upper end of the metering needle providing visual indication in the sight glass during fuel flow through the fuel inlet means, upwardly through the orifice means around the metering needle, upwardly through the sleeve means inner fuel passage means, through the outlet port means and downwardly through the outer fuel passage means, and through the fuel outlet means of the tubular body indicating the rate of fuel flow through said orifice means.

2. The improved meter construction defined in claim 1 in which the sleeve means has top and bottom collar means with outer diameters complementary to the diameter of the vertically extending tubular body opening, and an integral main tubular portion extending between said collar means; and in which the tubular portion of the sleeve means is spaced from the tubular body providing the relief means within the tubular body opening which forms the outer fuel passage means.

3. The improved meter construction defined in claim 2 in which the outlet port means includes a plurality of holes formed in the tubular portion of the sleeve means, adjacent to the top collar means.

4. The improved meter construction defined in claim 2 in which the orifice means has a circular knife-like edge; and in which the orifice means is formed within the bottom collar means of the sleeve means.

5. The improved meter construction defined in claim 1 in which the vapor ejector means is telescopically mounted on the open top end of the sleeve means; in which the outlet port means includes a plurality of holes formed in the sleeve means adjacent the top end of the sleeve means; and in which the tapered end of the vapor ejector means extends into the sleeve means and projects below the outlet port means holes.

6. The improved meter construction defined in claim 5 in which the vapor ejector means has a cylindrical body portion with an integral top collar; in which the vapor ejector means tapered end has a conical configuration and extends downwardly from the cylindrical body portion; and in which the top collar is supported on the open top end of the sleeve means with the cylindrical body portion being in telescopical contact with the interior of the top collar means of the sleeve means.

7. The improved meter construction defined in claim 6 in which resilient washer means is mounted circumferentially on the collar means of the vapor ejector means and provides a seal at a junction between the vapor ejector means, tubular body and sight glass.

8. The improved meter construction defined in claim 1 in which the fuel outlet means communicates with the outer downward fuel passage means, adjacent the lower end of said outer passage means.

9. The improved meter construction defined in claim 1 in which resilient washer means is mounted on the upper end of the metering needle and is engageable with the vapor ejector means to provide a sealing effect between the central opening of the ejector means and the metering needle, when said needle is in a lowermost position.

10. The improved meter construction defined in claim 1 in which weight means is mounted on the upper end of the metering needle to increase the effective weight of said needle for metering fuel flow of fuels having various densities.

11. The improved meter construction defined in claim 10 in which the weight means is an annular member telescopically mounted on the metering needle; in which a resilient washer is mounted on the upper end of the needle and retains the annular weight thereon; and in which the washer is engageable with the vapor ejector means providing a seal for the central opening of the ejector means and the metering needle, when said needle is in a lowermost position.

12. The improved meter construction defined in claim 1 in which the upper end of the metering needle is formed with a position indicating head; and in which the indicating head is spaced sufficiently from the sight glass to compensate for irregularities in said sight glass.

13. The improved meter construction defined in claim 1 in which the central opening of the vapor ejector means is accurately controlled with respect to the upper portion of the metering needle, with said needle being freely slidable with respect to said vapor ejector yet restricting passage of fuel vapor into the sight glass through said central opening around said metering needle.

14. The improved meter construction defined in claim 13 in which the controlled relationship between the central opening of the vapor ejector means and metering needle provides a damping action on said needle.

15. The improved meter construction defined in claim 1 in which the metering orifice means is formed in the bottom end of the sleeve means.

16. The improved meter construction defined in claim 15 in which the metering orifice means provides a restricted opening between the lower portion of the tubular body vertically extending opening and the inner fuel passage means of the sleeve means.

* * * * *

UNITED STATES PATENT AND TRADEMARK OFFICE
CERTIFICATE OF CORRECTION

PATENT NO. : 3,985,029
DATED : October 12, 1976
INVENTOR(S) : Walter F. Green

It is certified that error appears in the above-identified patent and that said Letters Patent are hereby corrected as shown below:

Column 1, line 11, change "improvement" to --improvements--
Column 1, line 46, change "thos" to --those--
Column 3, line 12, insert --mounted-- between "movably" and "within"
Column 3, line 22, change "downwardy" to --downwardly--
Column 4, line 17, change "body" to --Body--
Column 4, line 59, change "window" to --Window--
Column 6, line 5, change "lowere" to --lower--
Column 6, line 17, change "form" to --from--
Column 7, line 59, insert --and-- between "above" and "in"

Signed and Sealed this

Fourteenth Day of December 1976

[SEAL]

Attest:

RUTH C. MASON
Attesting Officer

C. MARSHALL DANN
Commissioner of Patents and Trademarks